United States Patent
Kaye et al.

(10) Patent No.: US 9,585,062 B2
(45) Date of Patent: Feb. 28, 2017

(54) SYSTEM AND METHOD FOR IMPLEMENTATION OF DYNAMIC ENCODING RATES FOR MOBILE DEVICES

(75) Inventors: Hagen Kaye, Kitchener (CA); Wayne Mallet, Kitchener (CA); David Sze, Waterloo (CA)

(73) Assignee: DEJERO LABS INC., Waterloo, Ontario (CA)

(*) Notice: Subject to any disclaimer, the term of this patent is extended or adjusted under 35 U.S.C. 154(b) by 1268 days.

(21) Appl. No.: 13/439,352

(22) Filed: Apr. 4, 2012

(65) Prior Publication Data

US 2012/0250762 A1   Oct. 4, 2012

Related U.S. Application Data

(63) Continuation-in-part of application No. 13/183,652, filed on Jul. 15, 2011, now Pat. No. 9,042,444.
(Continued)

(51) Int. Cl.
   *H04N 7/18* (2006.01)
   *H04W 28/08* (2009.01)
   (Continued)

(52) U.S. Cl.
   CPC ............. *H04W 28/08* (2013.01); *H04L 47/25* (2013.01); *H04L 47/38* (2013.01); *H04L 65/607* (2013.01);
   (Continued)

(58) Field of Classification Search
   CPC ......... H04N 19/00012; H04N 19/0006; H04N 19/00169; H04N 19/00187;
   (Continued)

(56) References Cited

U.S. PATENT DOCUMENTS 7,529,230 B2   5/2009   Lewis et al.
8,121,069 B2   2/2012   Lewis et al.
(Continued)

FOREIGN PATENT DOCUMENTS

CA   2505936 A1   5/2004
CA   2671266 A1   1/2011
(Continued)

OTHER PUBLICATIONS

Uk Intellectual Property Office, Examination Report under Section 18(3) dated Jun. 19, 2014, issued on Great Britain Patent Application No. 1302081.3.
(Continued)

*Primary Examiner* — Andy Rao
(74) *Attorney, Agent, or Firm* — Norton Rose Fulbright Canada LLP

(57) ABSTRACT

There is disclosed a system and method for transmission of data signals from a mobile device to a network. In an embodiment, the method comprises encoding video data at a first encoding rate into a plurality of video frames using a first encoding module; encoding video data at a second encoding rate into a plurality of video frames using a second encoding module; detecting a change in the availability of wireless bandwidth in the network; and switching a selector to retrieve frames from either the first encoding module or the second encoding module for transmission in dependence upon the available wireless bandwidth. The encoding rate of whichever one of the first encoding module and the second encoding module is currently not selected is successively increased or decreased, and a selector is switched to retrieve frames from either the first encoding module or the second encoding module.

22 Claims, 11 Drawing Sheets

Related U.S. Application Data

(60) Provisional application No. 61/364,598, filed on Jul. 15, 2010.

(51) Int. Cl.

| | | |
|---|---|---|
| *H04L 12/825* | (2013.01) | |
| *H04L 12/811* | (2013.01) | |
| *H04W 28/14* | (2009.01) | |
| *H04N 21/4402* | (2011.01) | |
| *H04N 21/442* | (2011.01) | |
| *H04L 29/06* | (2006.01) | |
| *H04N 19/196* | (2014.01) | |
| *H04N 19/115* | (2014.01) | |
| *H04N 19/103* | (2014.01) | |
| *H04N 19/146* | (2014.01) | |
| *H04N 19/152* | (2014.01) | |
| *H04N 19/164* | (2014.01) | |
| *H04L 12/801* | (2013.01) | |
| *H04L 12/841* | (2013.01) | |
| *H04L 29/08* | (2006.01) | |
| *H04N 21/414* | (2011.01) | |
| *H04N 21/61* | (2011.01) | |

(52) U.S. Cl.
CPC ........... *H04L 65/80* (2013.01); *H04N 19/103* (2014.11); *H04N 19/115* (2014.11); *H04N 19/146* (2014.11); *H04N 19/152* (2014.11); *H04N 19/164* (2014.11); *H04N 19/196* (2014.11); *H04N 21/44029* (2013.01); *H04N 21/44245* (2013.01); *H04W 28/14* (2013.01); *H04L 47/14* (2013.01); *H04L 47/28* (2013.01); *H04L 67/32* (2013.01); *H04L 69/14* (2013.01); *H04N 21/41407* (2013.01); *H04N 21/6181* (2013.01)

(58) Field of Classification Search
CPC ....... H04N 19/00193; H04N 19/00242; H04N 19/00206; H04N 19/0024; H04N 19/00472; H04N 19/00521; H04N 19/00478
USPC ........................................ 375/240.01–240.26
See application file for complete search history.

(56) References Cited

U.S. PATENT DOCUMENTS

| | | | |
|---|---|---|---|
| 8,135,398 | B2 | 3/2012 | Wang et al. |
| 8,897,322 | B1 | 11/2014 | Woleben |
| 2002/0114332 | A1 | 8/2002 | Apostolopoulos et al. |
| 2005/0163093 | A1 | 7/2005 | Garg et al. |
| 2007/0177579 | A1 | 8/2007 | Diethorn et al. |
| 2008/0049630 | A1 | 2/2008 | Kozisek et al. |
| 2008/0170630 | A1 | 7/2008 | Falik et al. |
| 2009/0110060 | A1* | 4/2009 | Cortes ............... H04N 19/46 375/240.02 |
| 2009/0168701 | A1 | 7/2009 | White et al. |
| 2009/0278941 | A1 | 11/2009 | Smith et al. |
| 2009/0279483 | A1 | 11/2009 | Falchuk et al. |
| 2010/0041397 | A1 | 2/2010 | Chutorash et al. |
| 2010/0054329 | A1 | 3/2010 | Bronstein et al. |
| 2010/0082834 | A1 | 4/2010 | Joung et al. |
| 2010/0197288 | A1 | 8/2010 | Camilleri et al. |
| 2011/0295727 | A1 | 12/2011 | Ferris et al. |
| 2012/0008560 | A1 | 1/2012 | Lewis et al. |
| 2012/0260296 | A1 | 10/2012 | Mallet et al. |
| 2012/0294355 | A1 | 11/2012 | Holcomb et al. |
| 2013/0077501 | A1 | 3/2013 | Krishnaswamy et al. |
| 2014/0250486 | A1 | 9/2014 | Sze et al. |
| 2015/0057044 | A1 | 2/2015 | Altman |

FOREIGN PATENT DOCUMENTS

| | | |
|---|---|---|
| CA | 2842098 A1 | 1/2012 |
| EP | 2273715 A2 | 1/2011 |
| WO | 2010030489 A2 | 3/2010 |
| WO | 2012006744 A1 | 1/2012 |
| WO | 2012099762 A1 | 7/2012 |

OTHER PUBLICATIONS

Patent Cooperation Treaty, International Search Report and Written Opinion dated Sep. 16, 2013, issued on PCT Application No. PCT/IB2013/000690.
United States Patent and Trademark Office, Office Action dated Dec. 19, 2013, issued in U.S. Appl. No. 13/446,825.
Norton Rose Fulbright Canada LLP, Office Action Response dated Mar. 19, 2014, submitted on U.S. Appl. No. 13/446,825.
Patent Cooperation Treaty, International Search Report and Written Opinion dated Aug. 25, 2011, issued on PCT Application No. PCT/CA2011/050437.
European Patent Office, extended European Search Report dated Oct. 29, 2015, issued in European Patent Application No. 13775296.0.
International Searching Authority, International Search Report and Written Opinion issued Oct. 30, 2015, in International Application No. PCT/CA2015/000448.
European Patent Office, Extended European Search Report dated Dec. 16, 2015, issued in European Patent Application No. 15178347.9.
Nguyen, T. et al., "Multiple Sender Distributed Video Streaming", IEEE Transactions on Multimedia, IEEE Service Centre, Piscataway, N.J. United States, vol. 6, No. 2, Apr. 1, 2004.
European Patent Office, European Search Report for EU Application No. 16164092.5 dated Aug. 22, 2016.
United States Patent and Trademark Office, Office Action dated Jul. 12, 2016, issued in U.S. Appl. No. 14/616,060.
USPTO, Office Action for U.S. Appl. No. 14/680,476 dated Oct. 18, 2016.

* cited by examiner

SYSTEM AND METHOD FOR IMPLEMENTATION OF DYNAMIC ENCODING RATES FOR MOBILE DEVICES

CROSS-REFERENCE TO RELATED APPLICATIONS

This application in a continuation-in-part of U.S. patent application Ser. No. 13/183,652, filed on Jul. 15, 2011 now U.S. Pat. No. 9,042,444, which claims the benefit of U.S. Provisional Patent Application No. 61/364,598, filed Jul. 15, 2010, all of which are hereby incorporated by reference.

FIELD

The present disclosure relates generally to the transmission of audio and video data streams over a wireless network. More particularly, the present disclosure relates to improving the continuity of the data stream with respect to wireless transmission anomalies.

BACKGROUND

In the area of video and audio data transmission there are many solutions to handle the loss of information through the delivery process. Typical poor delivery issues are solved today using either retransmission of data, or re-synchronization of the video and audio streams. Also used are buffering methods at the receiver that allow for small delays to access the data to allow for some data loss and slow delivery issues. It is also conceived that by splitting the video transmission into multiple paths that it is much less likely that a transmission failure occurs simultaneously on all paths. Therefore if each path contains enough data to build a video transmission there will generally always be data to display video information. When all paths are fully working then video information increases in quality. These traditional methods continue to be used today when transferring data over networks of all kinds.

In a closely related area, the recording and transmission of live video from a mobile device requires the solution of two different problems: a fixed hardware encoding rate, and a recording delay resulting from limited device resources.

For example it should be understood that the hardware based H.264 encoder used in an iPhone™ has a fixed encoding rate. And therefore once the encoding session is started, the application cannot change the session parameters (encoding rate, frame rate, etc.) until the session is stopped and restarted. Yet if conventional wireless mobile technologies are used for audio or video transmissions, variations in bandwidth (both bit rate and latency) must be accommodated to avoid frames being dropped by the receiver resulting in scrambled output (lost video signal/black screen).

SUMMARY

It is therefore desirable to overcome at least one disadvantage of conventional systems and methods for transmission of data signals over a wireless network.

In one aspect there is provided a system for transmission of data signals over a wireless network having: an encoding module for encoding video data into a plurality of buffers for transmission; and a feedback module for processing feedback from one or more sources, wherein the encoding module dynamically alters the amount of data that is encoded into the one or more video buffers based at least in part on the feedback received.

In another aspect there is provided a method for transmission of data signals over a wireless network including: encoding video data into a plurality of buffers; transmitting some of the data; processing feedback from one or mores sources, wherein the feedback relates to delivery parameters; and dynamically altering the amount of data passed into the buffers based at least in part on the data received.

In another aspect, there is provided a method of transmission of data signals from a mobile device to a network comprising: encoding video data at a first encoding rate into a plurality of video frames using a first encoding module; encoding video data at a second encoding rate into a plurality of video frames using a second encoding module; detecting a change in the availability of wireless bandwidth in the network; and switching a selector to retrieve frames from either the first encoding module or the second encoding module for transmission in dependence upon the available wireless bandwidth.

In an embodiment, the method further comprises: successively increasing or decreasing, in response to a change in the available wireless bandwidth of the network, the encoding rate of whichever one of the first encoding module and the second encoding module is currently not selected; and switching the selector to retrieve frames from the either the first encoding module or the second encoding module for transmission in dependence upon the available wireless bandwidth of the network.

In another embodiment, successively increasing or decreasing the encoding rate comprises applying successive stair-step increases or decreases in the encoding rate until failure is seen or no longer observed in a channel feedback from the network.

In yet another embodiment, the method further comprises: upon switching the selector to retrieve frames from either the first encoding module or the second encoding module for transmission in, dependence upon the available wireless bandwidth, shutting down the other of the first encoding module or the second encoding module to prepare for the next encoding rate change request.

In another aspect, there is provided a system for transmission of data signals from a mobile device to a network comprising: a first encoding module for encoding video data at a first encoding rate into a plurality of video frames; a second encoding module for encoding video data at a second encoding rate into a plurality of video frames; means for detecting a change in the availability of wireless bandwidth in the network; and means for switching a selector to retrieve frames from either the first encoding module or the second encoding module for transmission in dependence upon the available wireless bandwidth.

Other aspects and features of the embodiments herein will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

Figure 1:
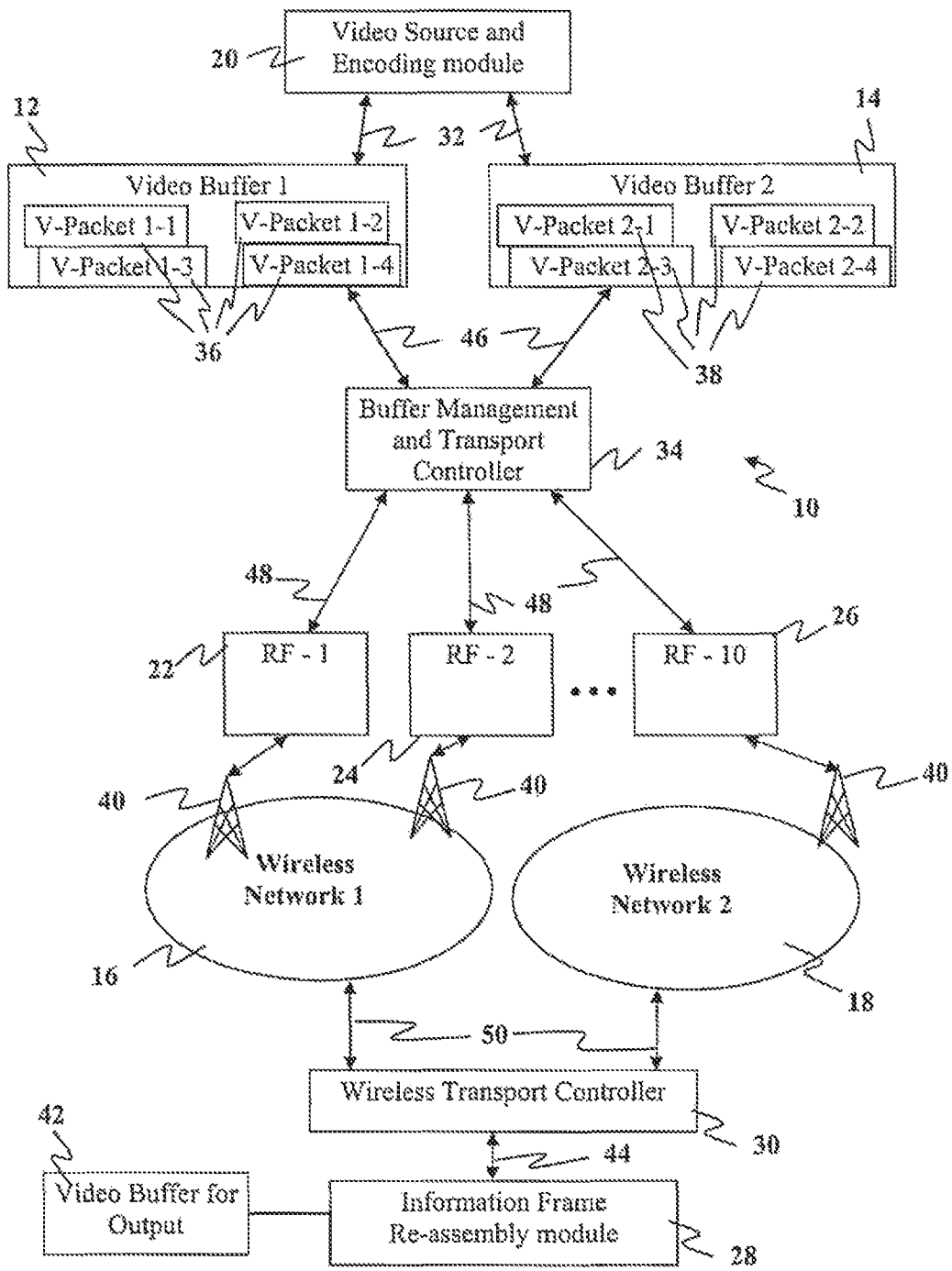
FIG. 1 is a block diagram of an exemplary system for distributing video signals.

Generally, this disclosure relates to a method and system for maintaining an improved level of continuity of a data stream when wireless transmission anomalies cause lost, corrupt or delayed data streams, and improving, the recording and transmission of live video from a wireless mobile device. The solutions described reduce the lost, corrupt or delayed data streams which may result in audio and video images that are jumping, broken, corrupt and perhaps even unwatchable.

It is conceived that there are still additional methods required to improve video quality and ensure a continuous stream of audio and video data. The problem with video data transmissions is further exacerbated when transferring broadcast quality video and ultra-high definition video data. In many instances continuity between audio and video frames can be important for the success of data being transferred. In a wireless environment there are additional demands and challenges that require further methods for making video transmission viable.

This disclosure relates in particular to the problem of transmitting audio and video data from a mobile device. This problem differs from previous work in this area, which has been focused on transmitting video data to mobile viewers. Different solutions are required for transmitting audio and video from a wireless mobile device for at least two reasons. One, transmitting video to mobile viewers is expected to be lossy, with frames dropping out on a regular basis. Many consumer solutions rely on a single radio connection to the Internet. Two, bandwidth is asymmetrical, with the bandwidth down (to the mobile device) typically being many times the available bandwidth back up from the device. For example, representative numbers in some cases would be approximately 2 Mbps down, 300 Kbps up. This transmission of data from wireless mobile devices includes the transmission of large volumes of data that may be time critical, for example, data transmissions of either normal definition video (720 by 576), high definition video (1920 by 1080), or ultra high definition video (7680 by 4320). The transmission may also include unique environments like real-time news reporting, mobile news, reality television shows, sporting event coverage and a range of similar situations where the information gathered is dynamic and mobile. In these situations a wireless link to a wireless infrastructure may be used by many industries. Such wireless networks include general packet radio service (GPRS), enhanced data for global evolution (EDGE), universal mobile telecommunication system (UMTS), wideband code division multiple access (W-CDMA) and many other 3G or 4G networks. Other wireless networks include WiFi, i.e. 802.11 technology (with all of its various standards), or a newer class of wireless technologies called worldwide interoperability for microwave access (Wi-MAX) and long-term evolution (LTE) that offer even greater throughputs and are intended to aid in delivering data such as television on demand and video conferencing on demand.

In this disclosure, the term video buffer is intended to refer to audio and video encoded data from a source being live, for example a video camera, a high-definition mobile device such as a mobile phone with digital camera capabilities, tablet computers etc., or from a stored source like a disk or other storage media. Packaged information buffers for transmission over a wireless network will be referred to as V-Packets. Also in this disclosure the term mobile transmitter will refer to any sort of wireless mobile device being used to transmit information buffers to a destination.

As described above, the present system and method addresses some of the limitations of transmitting from a wireless device in prior designs, particularly when the encoding rate from the wireless device's hardware encoder is fixed. A fixed encoding rate gives few options when transmitting a video stream. One could attempt to characterize the available channel(s) bandwidth and, based on that information, choose a high encoding bit rate (best case) and live with any frame loss that results when the available network, bandwidth fluctuates. Each time a frame is lost, the recorded stream is corrupted, either with decoding error artifacts or with a completely black screen. The result is a generally good picture dependent on the network bandwidth, but with many errors if there are fluctuations. Alternatively, one could attempt to characterize the available channel(s) bandwidth and, based on that information, select an encoding rate that is low enough to minimize lost frames. But while less susceptible to breakup and artifacts, the resulting image quality at the receiver will be poorer with less detail.

With the present solution, a dynamically variable encoding rate (e.g. as implemented with the present stair step technique) provides the best quality picture possible for transmission of streaming video and audio from a mobile device to connected networks. More generally, since an encoder in the mobile device can react to changes in available network bandwidth, the present system and method dynamically changes session parameters up or down (for example of the transmission bit rate) in order to take full advantage of the available bandwidth, even when the mobile device has a fixed hardware encoder. If lost frames do occur, a buffer management and transport controller is able to recover before the output stream is affected.

The present system and method will now be described in more detail with reference to the drawings.

FIG. 1 illustrates a block diagram of an exemplary system 10 with multiple information buffers 12, 14 using multiple wireless networks 16, 18 to transmit information. In situations and environments where information is preferably dynamically delivered from mobile locations or devices, a mobile sourced video solution is required. This information or mobile sourced video may have originated from cameras or some other advanced capture method or the information may have been pre-captured and saved to a storage media to be transferred at a later time. After preparing the video data into buffers 12, 14, a steady and continuous flow of buffers may be sent from a mobile transmitter to a receiver via various techniques. The system 10 provides the ability to modify the video quality at the source by adjusting the amount of video information encoded into the buffers 12, 14 at the transmitter as described herein. Video quality can be dynamically adjusted (improved or degraded) in response to feedback from the network both locally and remotely, such as, for example, local queues at the transmitter or the remote receiver.

In the system 10 of FIG. 1, the video source data is prepared for transmission and moved into the video buffers 12, 14 by the Video Source and Encoding module 20, which may contain a storage component used to store data or video information. Many video buffers could be used and the data may be divided between the various buffers. Captured information can include, for example, normal, high or extremely high definition audio and video content. Preparation may include advanced compression (for example moving picture expert group (MPEG) compression), packetization and other processes designed to improve transmission. In some embodiments, video data from a single source, either live or stored, can be divided into multiple video streams using a technique like Multiple Descriptive Coding (MDC). Other techniques can also be used to break the video data stream into different packets for delivery over various links. The division of the data is intended to allow for wireless delivery of data in multiple video buffers 12, 14 over one or more wireless network links, (Radio Frequency-1 (RF-1) 22, RF-2 24 and RF-10 26) over one or more wireless networks 16, 18 to an Information Frame Re-assembly component 28, via a wireless transport controller 30. Each of the processes shown can be executed within one or more computer systems and the division of labor between computer systems may be based on processing unit utilization and network capacity restrictions. Depending, on conditions and processing unit availability, a complex video splitting method like MDC can be used or a simple packetization and splitting method could be substituted in its place. Within this encoding stage, the number of frames-per-second (FPS) is determined and the output enables dynamic adjustment of the quantity of information that is placed into the video buffers 12, 14 and subsequently transmitted to the Information Frame Re-assembly component 28.

The linkage 32 between the Video Source and Encoding module 20 and the Video Buffers 12, 14 could be external, for example, over FireWire, a Universal Serial Bus (USB) link, Serial connection, Bluetooth, WiFi wireless link or some other high speed link. Alternatively, in a fully integrated system the Video Source and Encoding module 20 could be together with the Video Buffers 12 and 14 in the same physical housing.

The system 10 includes a Buffer Management and Transport controller 34 which acts as an interface to a plurality of Radio Frequency (RF) modules 22, 24 and 26. In FIG. 1 only three RF modules are illustrated as RF-1 22, RF-2 24 and RF-10 26, however any number of modules may be included depending on the system. The Buffer Management and Transport Controller 34 accesses and reads portions of data in the Video Buffers 12 and 14. The portions of data labeled as V-Packet 1-1 36 to V-Packet 2-4 38 are created based on various factors including, but not limited to, the packet size restrictions of the wireless networks 16 and 18, other packet transmission results, configuration parameters and other such guidance within the overall system architecture.

The Buffer Management and Transport Controller 34 receives messages from RF modules 22, 24 and 26. The RF modules 22, 24 and 26 can return messages from an Information Frame Re-assembly module 28, via the Wireless Transport Controller 30 and from interactions with one or more Wireless Networks 16, 18 through base stations 40 that are within a coverage region. These messages represent feedback on coverage, congestion, transmission failures with each base station 40 during the process of trying, to exchange messages. In turn this information guides the Buffer Management and Transport Controller 34 to decide what quality of video information to packetize, how much, information to send and through which RF modules 22, 24 and 26, and through which linkage 48.

Once information is received by the Information Frame Re-assembly module 28, the information is collected into a video buffer for output 42. This buffer could be within the same computer system as the Information Frame Re-assembly module 28 or it could be housed in a separate system through a well-known link, like USB, FireWire or some high speed transfer connection. Linkage 44 between the Wireless Transport Controller 30 and the Information Frame Re-assembly 28 could be over, for example, a high-speed computer bus (multiple CPUs in the same physical housing), or over gigabit Ethernet (TCP/IP) or some other well known coupling method. The wireless transport control has a further link 50, where it is linked to wireless networks within the coverage range. A further linkage is created between the Buffer Management and Transport Controller and the video buffers 46.

Figure 2:
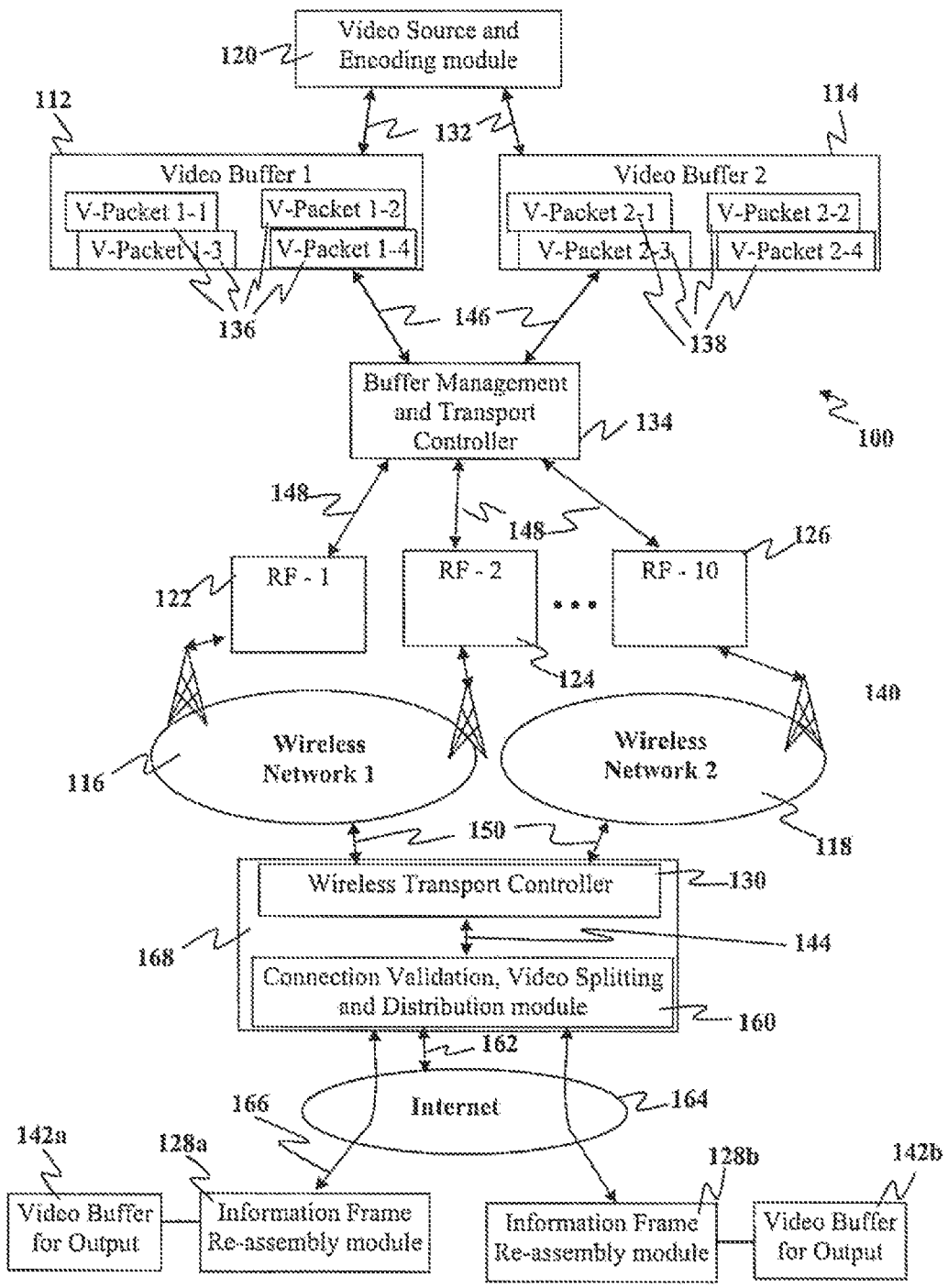
FIG. 2 is a block diagram of another exemplary system.

FIG. 2 illustrates a block diagram of another exemplary system 100 with multiple Video Buffers 112, 114 using multiple wireless networks 116, 118 to transmit, via a link 150, the video information to a distribution point 168 where it can be split for distribution. In this embodiment a Wireless Transport Controller 130 is coupled with a Connection Validation, Video Splitting and Distribution Module 160 (referred to as a Distribution module 160), via a link 164. The Distribution module 160 acts as a central hub for dealing with the distribution of Video Buffers 112, 114 to a large number of possible Information Frame Re-Assembly components 128a, 128b. This distribution point 168 is coupled to a wide area network like the Internet 164 via any well known high-speed link 162 for example, T1 lines running megabit or gigabit speeds. The distribution point may be directed coupled to at least on Information Frame Re-assembly module through a link 166.

The Information Frame Re-assembly components 128a, 128b could include cable stations, news outlets, Internet content centers, streaming Internet distributors and a wide range of existing and future distribution options. The Information Frame Re-assembly component is also connected to a video buffer 142 which is adapted to output or display the video or other data. In FIG. 2, various elements of the system are consistent to FIG. 1, but the Wireless Transport Controller 130 is centralized in a way that allows received V-Packets 1-1 to 2-4 136, 138 to be split, distributed and seen by a wider audience over a wide area connection network like the Internet 164. Distribution over the Internet 164 allows for quick worldwide distribution of real-time data from mobile camera collecting news and real-time events throughout the world. Another advantage of this embodiment 168 is that connections can be authorized, paid for and validated at any time. This system may allow new distributions to be more easily added to existing content with less negative impact on the overall system. Connections between the Information Frame Re-assembly components 128a, 128b would take place using common TCP/IP based protocols 166, such as real-time streaming protocol (RTSP) and real-time messaging protocol (RTMP), which are easily able to distribute audio and video content. Such distributions are well known in the industry and have far fewer problems than ensuring the reliability of the data reception over the Wireless Networks 116, 118 that were used to collect the data in the first place.

The centralized Information Frame Re-assembly component allows for remote management and control of the mobile unit. In addition to status information, the central control pushes configuration instructions to the mobile unit, directing operation, which input/output to use, general quality settings, etc. The central control is capable of remotely configuring both the directly connected for example the mobile transmitter or Buffer Management and Transport Controller 134, to the server and those that route through the central systems, for example Information Frame Re-assembly module 128a, 128b.

As in FIG. 1, a Video Source and Encoding module 120 contains data that is distributed to the video buffers 112, 114 through a link 132. The Buffer Management and Transport Controller 134 receives the buffers through a link 146 and distributes the data to a plurality of RF modules 122, 124 and 126. The RF modules 122, 124 and 126 transmit the data to a base station 140 on range of a wireless network 116.

Figure 3:
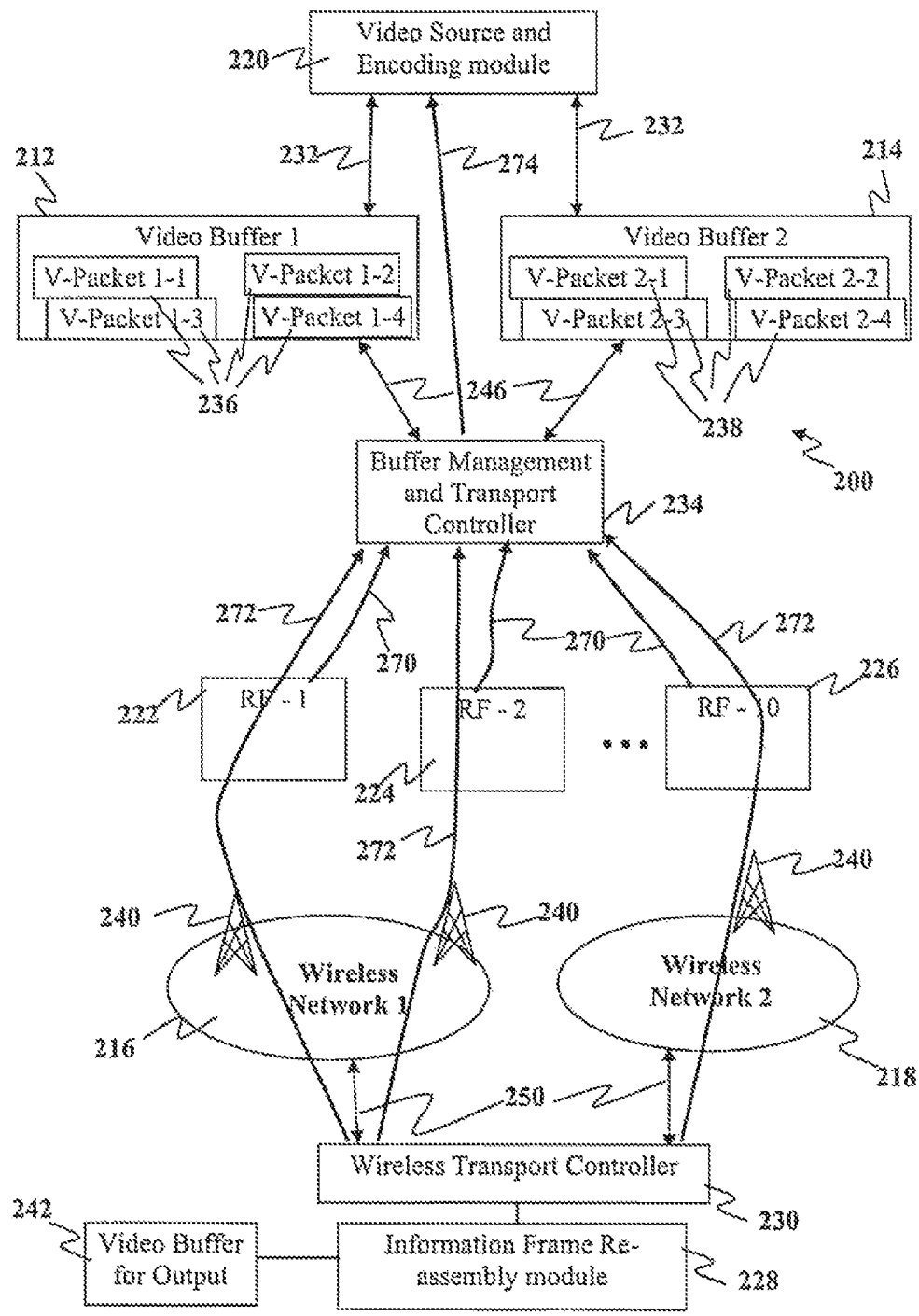
FIG. 3 is a block diagram of yet another exemplary system and feedback that can occur within the system.

FIG. 3 illustrates a block diagram of yet another system 200 and the feedback that occurs within the system 200. The system has a video source encoding module 220 which relays video or other data via a link 232 to video buffers 212, 214. The system 200 further includes a Buffer Management and Transport Controller 234, which access the video buffers 212 and 214 trough a link 246, attempts to deliver V-Packets 1-1 to 2-4 236, 238 to an Information Frame Re-assembly module 228. Various failures and issues may take place along the delivery path. In an exemplary system that uses Wireless Networks 216, 218 as part of the delivery path these failures may increase in frequency and seriousness as compared to a wired connection. In one case, the first set of failures may occur as all attached RF modules 222, 224, 226 attempt to wirelessly transmit the V-Packets 236, 238 to a specific base station 240. Base stations 240 experience frequency congestion issues, as the RF module 222, 224, 226 moves, the coverage indications and receive signal strength indicator (RSSI) can show degradation in link quality and its ability to receive the information. Errors due to spontaneous congestion may occur when an increase of wireless mobile devices wish to transmit at the same time. All of these failures, indicators and congestion issues result in the RF modules, i.e. RF-1 222, RF-2 224 and RF-10 226 sending signals 270 back to the Buffer Management and Transport Controller 234.

For V-Packets 236, 238 that make it across to the base station 240 there is still the transmission of information across the Wireless Network 216, 218. Within the Wireless. Network 216, 218 an additional set of failures can occur. These failures can result from congestion issues within the Wireless Network 216, 218, lost packets, damaged packets that can not be understood and a range of other internal issues. As the Information Frame Re-assembly module 228 receives V-Packets 236, 238 it can infer which V-Packets 236, 238 did not make it across the Wireless Network 216, 218. The Buffer Management and Transport Controller 234 can also write a time stamp into each V-Packet 236, 238 just before it performs the transmission to the base station 240. This time stamp can then be used by the Information Frame Re-assembly module 228 to determine how long each V-Packet 236, 238 took to make it across the various hops to reach the base station. This one-way transmit time can then be used to determine if the Wireless Network 216, 218; the base station 240 or the link to the Wireless Network 250 is bottlenecked and may cause unusual delays in reception of the V-Packets 236, 238. This information and statistics regarding the transmission is collected by the Information Frame Re-assembly module 228 and transmitted back as a status message 272 to the Buffer Management and Transport Controller 234. Further status messages may be relayed similarly from the RF modules.

With all this status information 270, 272 returning to the Buffer Management and Transport Controller 234. The Buffer Management and Transport Controller 234 has the ability to make decisions intended to improve the overall continuity of V-Packet 236, 238 information flow over each attached RF Module 222, 224, 226. Since there can be any number of RF modules 222, 224, 226, this decision making ability can relate to specific feedback paths. For example throughput calculations for V-Packets 238, which could be sent through RF-10 226 into Wireless Network 2 218 and over link 250, could be taking ⅓ of the time for V-Packets 236 shipped over Wireless Network 1 (216). This information is taken into account when the Buffer Management and Transport Controller 234 merges all feedback information into a common feedback 274 to the Video Source and Encoding Module 220. The Video Source and Encoding Module 220 could be told to limit the amount of video buffer data 212, 214 it generates and stores into the buffer area. Image quality is reduced or degraded or it can be increased and improved in various different ways. Some of these ways include scaling down the image, which results in a generalized loss of quality over the entire frame. Alternatively the amount of video buffer 212, 214 can be reduced by decreasing the encoding bit rate, which tends to affect areas of higher movement or the frame rate can be decreased or increased. By adjusting the encoding and frame rates the number and quality of video images encoded changes, thus affecting the information encoded into the video buffer. A significant decrease in the encoding rate will eventually create a visibly degraded image at the receiving end.

The Buffer Management and Transport Controller, as shown in FIGS. 1,2 and 3, uses several factors to determine if the capacity of a particular RF channel has changed (either increased or decreased) including, but not limited to, network latency; connection RSSI; packet delivery failure; delivered bit rate compared, to sent bit rate; and pending data (backlog).

In regard to network latency, the current network latency is measured by synchronizing the clocks between the client and the server and continuously measuring the delay introduced by the network in delivering all packets. Once the latency is known, the Buffer Management and Transport Controller uses the information to determine whether an RF Connection is behaving well, compared to another connection or compared to the connection itself. For example, if the connection was compared with itself, the current network latency may be compared to the latency in the past X seconds, where X is a predetermined number used for the comparison. A poorly performing connection may have a highly variable latency that increases as the traffic rate increases, or may have a latency that is simply too large for the channel to be useful, for example an approximately 2 second delay in short latency mode with a 1.5 glass-to-glass latency. For instance, each active audio/video stream has an associated end-to-end (or glass-to-glass) latency—the configured time delay between when the image was captured by the camera and when it is actually delivered to the video buffer for output. If the network delay of a particular RF interface increases significantly such that the glass to glass latency is threatened, that RF interface is either deprecated or shut down entirely to prevent the stream from being corrupted. This is particularly an issue for transmissions using an extremely short glass-to-glass latency, for example, less than approximately 2 seconds. Also, during transmission, if the network latency increases beyond a configured tolerance, it is also possible that the RF interface is sending more data than the network is capable of delivering or data is backing up inside the RF interface/network. In this circumstance the Buffer Management and Transport controller may decrease the amount of data the RF interface/network is allowed to transmit. When the latency returns to normal, the Transport control may allow the RF interface to carry more data The Buffer Management and Transport controller also uses the measured network delay to anticipate lost packets and retransmit them before the output video buffer misses them. If a packet hasn't been delivered and the time passed is longer than the network latency at the time that the RF interface sent it, the packet is considered lost. Also, if the packet is reported lost and the scheduled play time for the packet is close to the network delay of the fastest RF interface, in other words, the RF interface with the lowest network delay, the packet is assumed lost and resent.

Connection RSSI may aid in determining whether a specific channel is actually available.

Packet delivery failure is the rate at which packets are lost when sent via a particular RF interface. The status packets sent back to the Buffer Management and Transport Controller include statistics regarding the number of packets lost in a particular interval. The status packets also identify particular packets not received. These packets are resent in a timely manner to prevent the received stream from failing/breaking up due to missing information (a dropped frame), An increasing packet delivery failure rate is an indicator of an unstable/unreliable RF interface and the associated bit rate must be decreased.

Regarding delivered bit rate compared to sent bit rate, the amount of data sent from the transmitter is compared to the reported volume of data received by the server. The goal ratio for any given period should be close to one which would indicate the server received all of the data sent by the transmitter. In typical operation, a ratio of 90% is enough for a healthy connection. If the ratio is too low, then the network connected to that particular RF interface is not reliably transmitting data as fast as the RF interface is sending it. When this circumstance occurs, the RF interface may decrease its transmission rate and allow the network to catch up. Synchronized clocks may be used for this comparison as the transmitter and receiver are intending to compare equivalent windows in time.

In an alternative embodiment, a mechanism may instruct the network to allocate more bandwidth to the mobile device transmitting data. For example, in a network having a Quality of Service agreement, an indicator or trigger may be included that would indicate the desire to provide greater bandwidth for the ongoing transmission. This added mechanism may require further modification on the typical Quality of Service agreements currently in place.

Pending data (backlog) is the queue of packets awaiting transmission over any of the available RF interfaces. The Transmitter control knows the current transmission rate of all connected/operating RF interfaces. The volume of data to be sent which would include continuous data generated by the source plus any packets that were detected/reported as lost. The presence of backlog does not necessarily require an immediate adjustment to the encoding bit, rate by the Video Source and Encoding Module 220. For longer glass-to-glass latencies, the Information Frame. Re-assembly Module 228 will have more audio/video data buffered, which gives the RF interfaces more time to attempt to clear the backlog without a reduction in encoding bit rate.

The audio encoding bit rate is much smaller relative to the flow of video information and is unlikely to have an impact on the system's ability to transmit a data stream. There may be little benefit in attempting to limit the audio signal bandwidth in order to preserve signal integrity.

Many other factors could affect how the Buffer Management and Transport controller 234 sends status signals 274 onto the Video Source and Encoding module 220. The examples provided above are not meant to be exhaustive but representative of possible signals and failures to create feedback in the system. The Buffer Management and Transport controller may further include a storage component where information and other factors relating to the transmission are stored for later analysis.

Figure 4A:
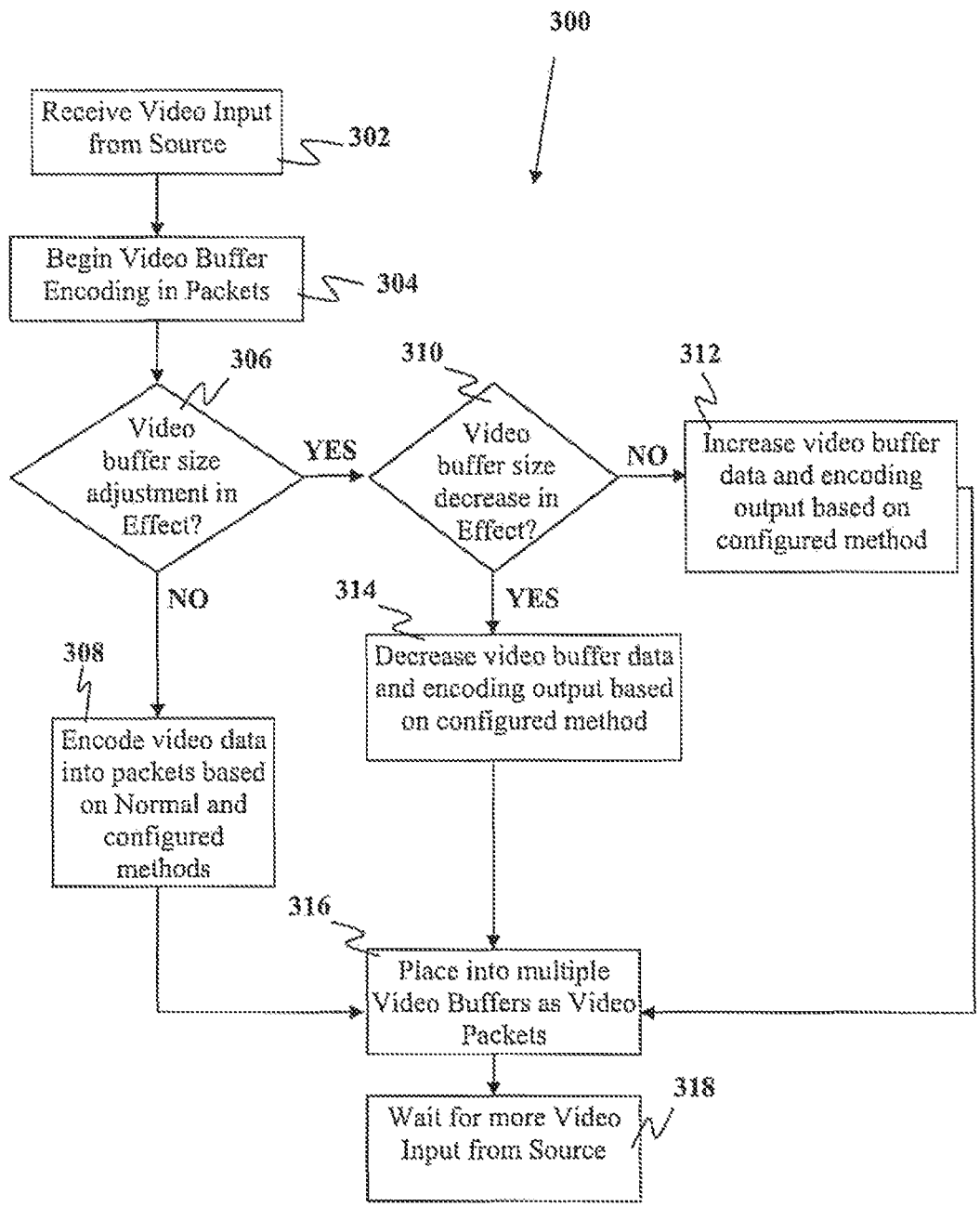
FIGS. 4A and 4B are flow charts showing a method of video source scaling.
Figure 4B:
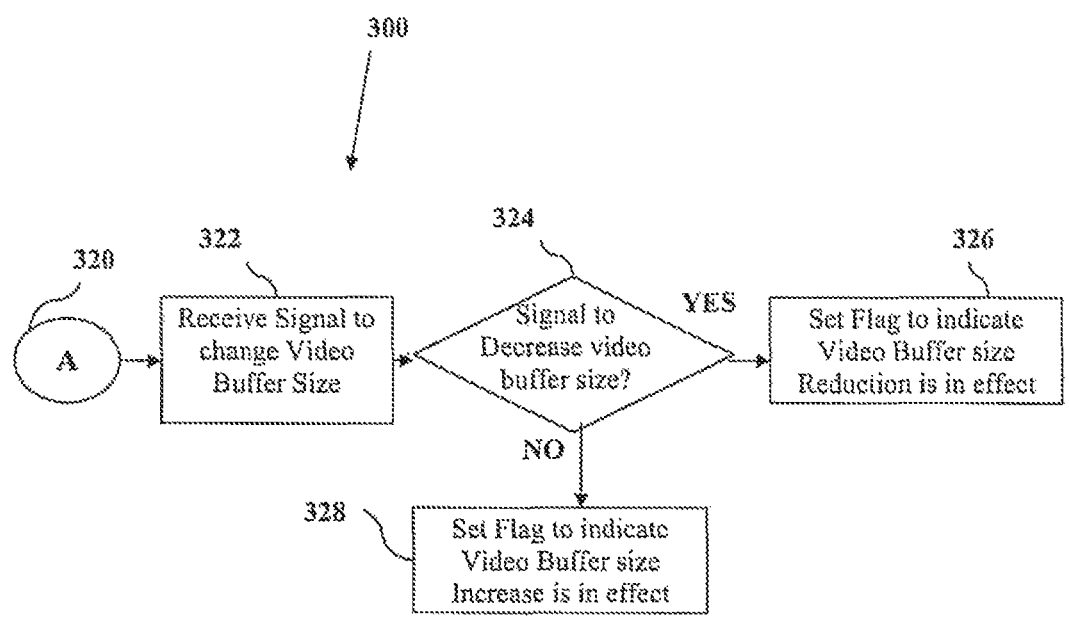

FIGS. 4A and 4B provide a flow chart of a method of video source scaling 300 within the Video Source and Encoding module. This flow chart represents, a small part of the overall functionality of the Video Source and Encoding, module. Video input is received from a source 302. As described above, the video input can be from a range of different sources and can be broadcast quality video, high-definition, ultra-high definition or some further large sized, video data. At the start of the process the video buffer encoding component 304 takes charge of the data and determines if there is any video buffer size adjustment in effect 306. Dynamic video size adjustment is an exemplary method for increasing or decreasing the amount of data that must be transmitted wirelessly. If video buffer size adjustment is not in effect then regular encoding of the video data takes place 308 into video packets based on the normal and configured methods. As mentioned these methods include, for example, compression, for example, MPEG or other methods, encryption if required and packet splitting to move data through multiple video buffers for different Wireless Networks.

If video buffer size adjustment is in effect then a further check is, performed to see if video buffer size should be decreased 310. A video buffer size decrease is not in effect then the video buffer encoding can be increased based on the buffer size adjustment flag. The amount of adjustment is based on the improvements in the parameters being monitored. These parameters can include RSSI, base station saturation values, transmit failures, congestion values through the network, received latency by the remote receiver and many other similar parameters. When these values are analyzed against their previous values all improvements are compared and a determination is made using high and low water predetermined values. As values increase above thresholds then the amount of data can be increased. The method for increase 312 may follow the configured method used for decreasing the video buffer output. Methods to increase video image data quantity can include methods like: scaling up the image, which results in a generalized improvement of quality over the entire frame, by increasing the encoding bit rate, which tends to improve areas of higher movement, or the frame rate, can be increased.

If a video buffer size decrease is in effect 310 then the amount of data saved into video buffers is decreased 314. This decrease follows the configured method that is being used within the system. As discussed above, the method for decreasing can follow the configured method used for increasing the video buffer output. Methods to decrease video image data quantity can include methods such as scaling down the image, which results in a generalized decrease of quality over the entire frame, by decreasing the encoding bit rate, which tends to negatively affect areas of higher movement, or the frame rate can be decreased which can lead to jumpiness.

Once the amount of encoded data is determined to be unadjusted 308, increased 312 or decreased 314, the data is then placed into multiple video buffers 316. Once the buffers are written the system for transmitting returns to wait for additional video data from the input source 318.

To assist in the determination of when to adjust video buffer output the Video Source and Encoding Controller receives a signal (A) 320 from the Buffer Management and Transport module. The received signal indicates a video buffer size change is required 322. A check is made to determine if the size should be decreased 324. If the size is to be decreased a flag, or other indicator is set to indicate that the video buffer output should be reduced 326. Otherwise the flag is set to indicate that video buffer size should be increased 328.

Figure 5:
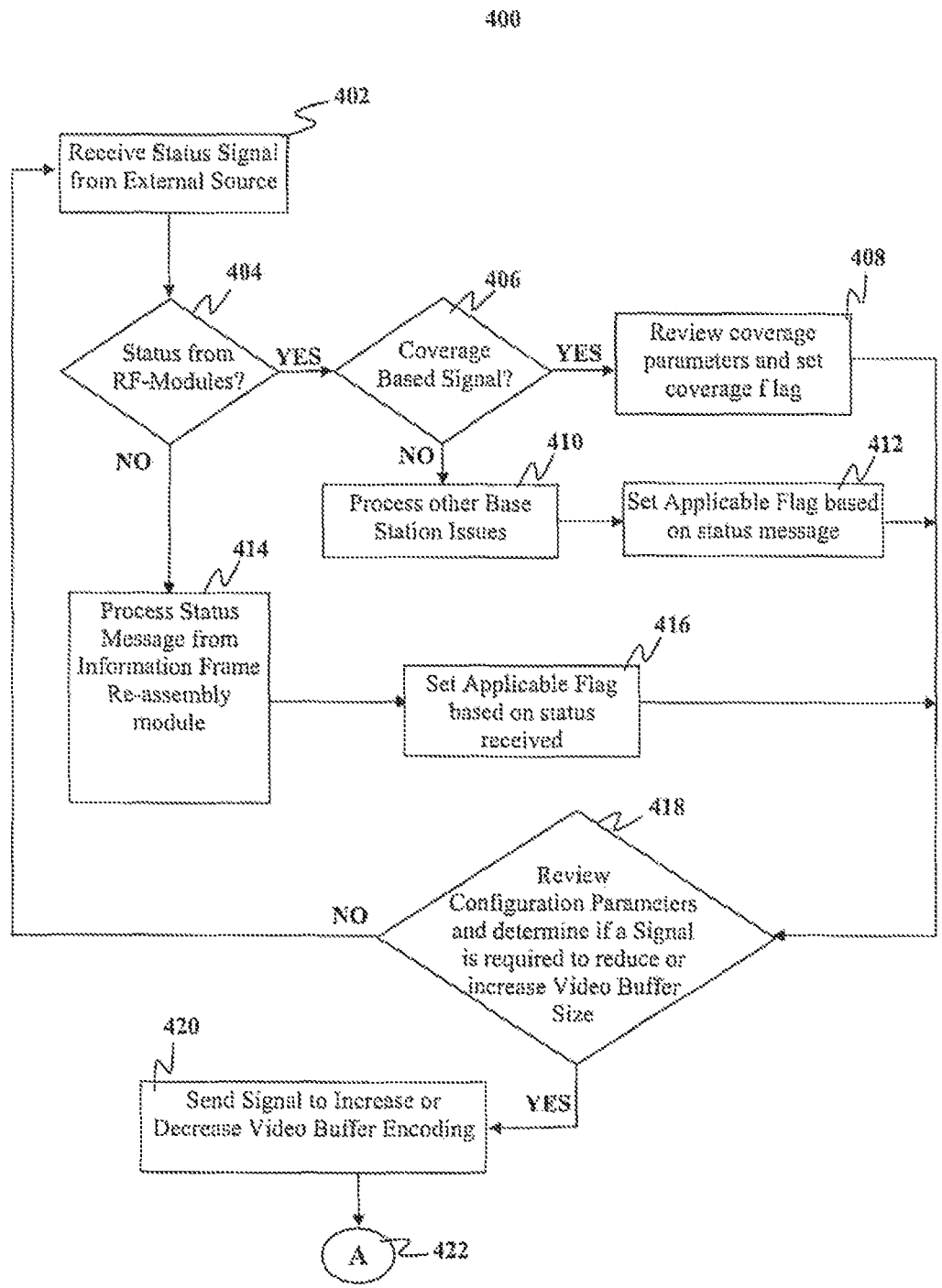
FIG. 5 is a flow chart showing another method of video source scaling.

FIG. 5 provides a flow chart of a method of video source scaling 400 within the Buffer Management and Transport module. This flow chart represents only one aspect of the overall functionality of the Buffer Management and Transport module. First, the Buffer Management and Transport module receives status signal information 402 from an external source. As previously shown, these sources may be RF modules or remote wireless transport controllers. If the status is from an RF-Module 404 then various indicators are checked. There are other possible indicators only a few indicators are shown in this flow chart for readability. Status messages or indicators are feedback that can be related to the current (or active) video stream, client state, network state, remote server/network state and/or wireless status. Current video stream state messages include statistics related to, for example, the current transmission, including received bit rate, sent bit rate, lost packet rate, packet interval times, last sent time, clock status, bytes sent and received, buffer sizes, latency statistics, current length of buffered data, and the current glass to glass delay. Client state messages notify the Buffer Management and Transport controller of configuration changes in the central control. Network state information includes applying weighting to networks which may allow preferential treatment, for example, some networks may be preferred due to cost and/or business agreements. Remote server/network information includes statistics about the end-point, whether the remote IFR is in use, bandwidth limited, available resources, such as disk space and processing power, and other end point information. Wireless status includes information related to the general health of the connected wireless networks such as reliability, throughput, historical behavior, and configuration.

As an example, the coverage signal RSSI is checked 406 to see if the range has changed considerably. This check can be based on a previously saved value from this RF-Module, it can include a high and low water threshold change value, or that minor changes are ignored. If the coverage indicator has changed significantly for better or worse the coverage parameters are checked 408 and a flag is set to indicate whether the change is significant enough to require amending some transmission parameters. The flag might indicate the level has dropped considerably or has increased considerably, or separate indicators may be used.

If the signal from the RF-Module is not coverage related then a range of other possible base station issues are checked 410. This could include base station congestion factors, transmit failure attempts, dead zone indicators, and base station handoff protocols in effect or other such wireless network anomalies. Once these are checked and analyzed the applicable flag is set 412 based on the status message and threshold levels. The flag could indicate conditions have improved or degraded.

If the status message is not from an RF-Module 404 then the status message may be from the Information Frame Re-assembly module. This status, message could indicate a change in the receive frequency in video packets, either better or worse reception or it could indicate congestion issues have changed for better or worse, or it could indicate many other conditions have changed in packet reception, for example, lost packets, packet delivery rate, current network latency/delay, received bit rate (bps) synchronized with sent bit rate, etc.

Based on the status message and various threshold conditions the theoretical bandwidth of the RF connection is recalculated. If the aggregate calculated bandwidth for all connected RF connections has changed, the applicable flag is set to indicate an improvement or degradation of video buffer transfers 416.

Once this review of the status message is complete and the appropriate indicators have been set, a final review of the system changes is made 418. Within the final check all flags are reviewed against a preconfigured high or low water threshold mark to determine whether a sufficient change in the transmission by the system has been detected. Although a low-water and high-water threshold mark technique is discussed here many other methods could be used to determine whether the detected changes in video buffer transfers are significant enough to alter the video buffer output Based on this determination a signal to increase or decrease the video buffer output is sent 420 to the Video Source and Encoding module and it connects through (A) 422 to FIGS. 4A and 4B.

As noted above, a closely related problem is the recording and transmission of live video from a mobile device with limited resources. For example, in order to provide sufficient video performance, a mobile device may have a fixed encoding rate (based on H.264, for example). In such a case, once the encoding session is started, the application cannot change the session parameters (encoding rate, frame rate, etc.) until the session is stopped and restarted. Without the ability to control the encoding rate dynamically, a video stream generates a significant volume of data at a relatively of constant bandwidth. The available bandwidth for transmitting data on a wireless network is unpredictable and variable. Thus, unless the controlling software explicitly accommodates variations in bandwidth (both bit rate and latency), data buffers may be dropped by a receiver, resulting in scrambled output, or possibly a lost video signal or black screen.

To address the problem of variations in network bandwidth, the inventors have developed a new system and method that integrates techniques for taking such network bandwidth variations into account, thus enabling improve audio or video data transmissions using wireless mobile devices. At a high level, an encoder in accordance with the present invention consists of a capture source, a variable rate encoder, and a core system for addressing variations in network bandwidth as described herein. This is illustrated in FIG. 6, which shows a block diagram of an exemplary variable rate encoder in accordance with an embodiment.

Figure 6:
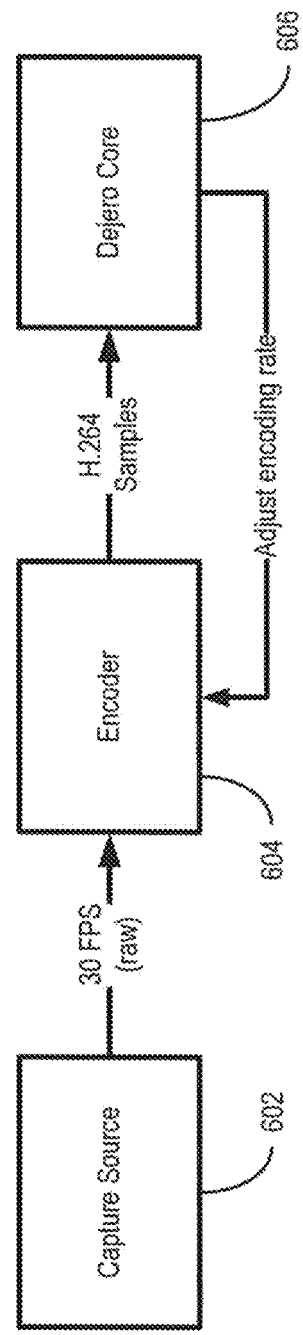
FIG. 6 is a block diagram of an exemplary variable rate encoder in accordance with an embodiment.

In an implementation of the present invention, the system may consist of three blocks and a feedback loop to adjust the encoding rate, as shown in FIG. 6. The capture source 602 records the audio/video data and makes it available, as a stream of raw data at for example 30 frames/second. An encoder 604 encodes the stream and converts it to a compressed (lossy) format for easier transport over the wireless networks, and a transmission module 606 handles the actual delivery to the server end point. The system is operable, based on feedback from the transmission module 606, to alter the encoding rate and increase or decrease the quality of the output (and increase or decrease the volume of encoded data) in response to current network conditions, virtually in real time.

Figure 7:
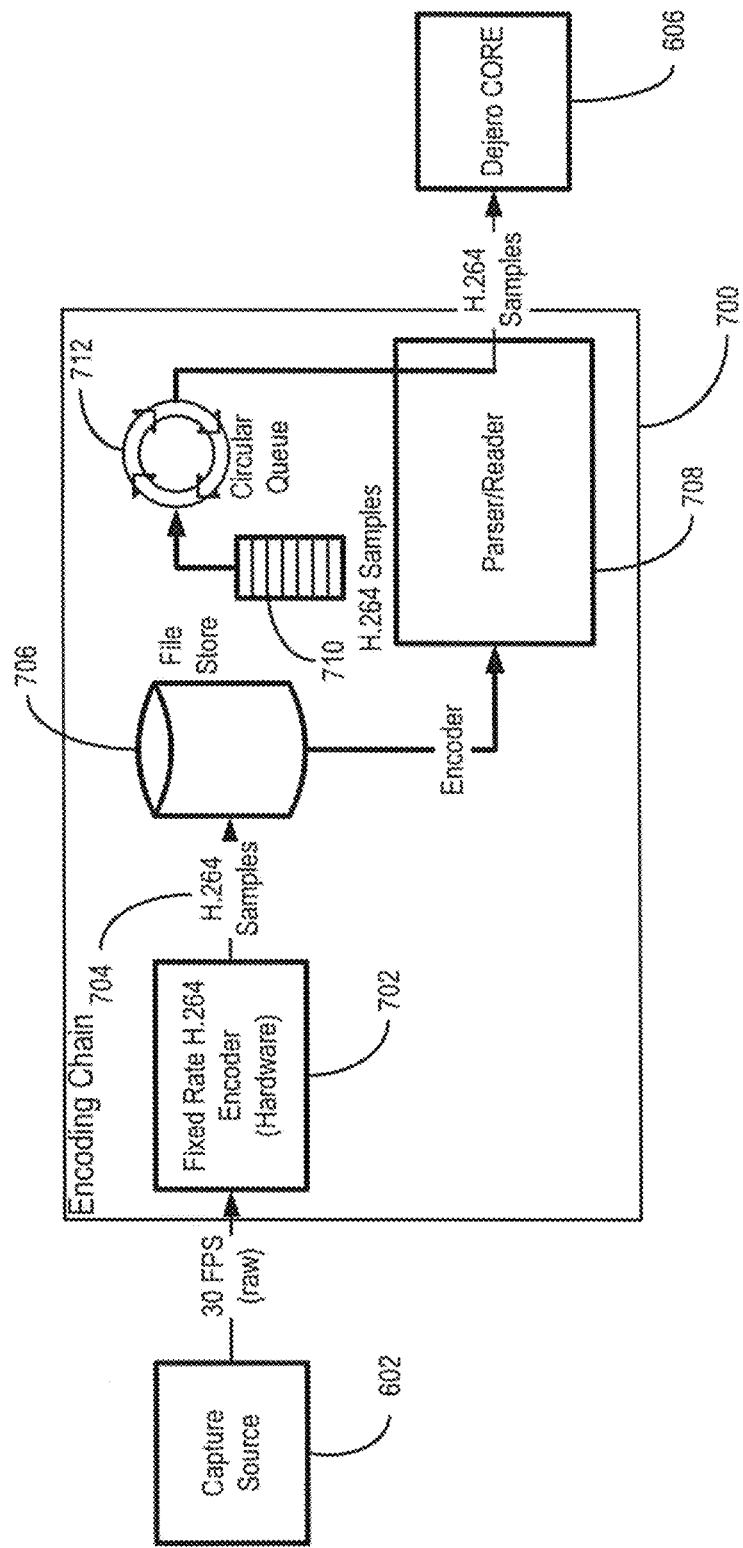
FIG. 7 is a block diagram of a more detailed view of a variable rate encoder showing the encoding chain in accordance with an embodiment.

Now referring to FIG. 7, shown is a block diagram of a more detailed view of a modified variable rate encoder module 700 with an encoding chain. In accordance with an embodiment of the present invention, encoder module 700 may be used to write a plurality of fragmented video files, fragmented into fractions of a second while a recording is active. For example, encoder module 700 may fragment the video files five times per second. In this illustrative example, encoder module 700 includes a fixed rate hardware encoder 702 which outputs encoded samples 704. These samples 704 may be temporarily stored in a file store 706 before being provided as an input to a parser/reader 708.

Each time the encoded samples are parsed and indexed in parser/reader 708, there are approximately six encoded frames 710 (there could be a little variation depending on timing of the request) available for transmission. The parser/reader 708 then takes the encoded frames 710 and places them into a circular queue 712 to be delivered to the core system module 606. In one implementation, by parsing the H.264 samples in this manner, this effectively allows the encoder module 700 to retrieve recorded frames with maximum of a six framed introduced delay. Another embodiment allows the parser/reader 708 to take the encoded frames directly from the encoder, minimizing any induced encoding latency.

Figure 8:
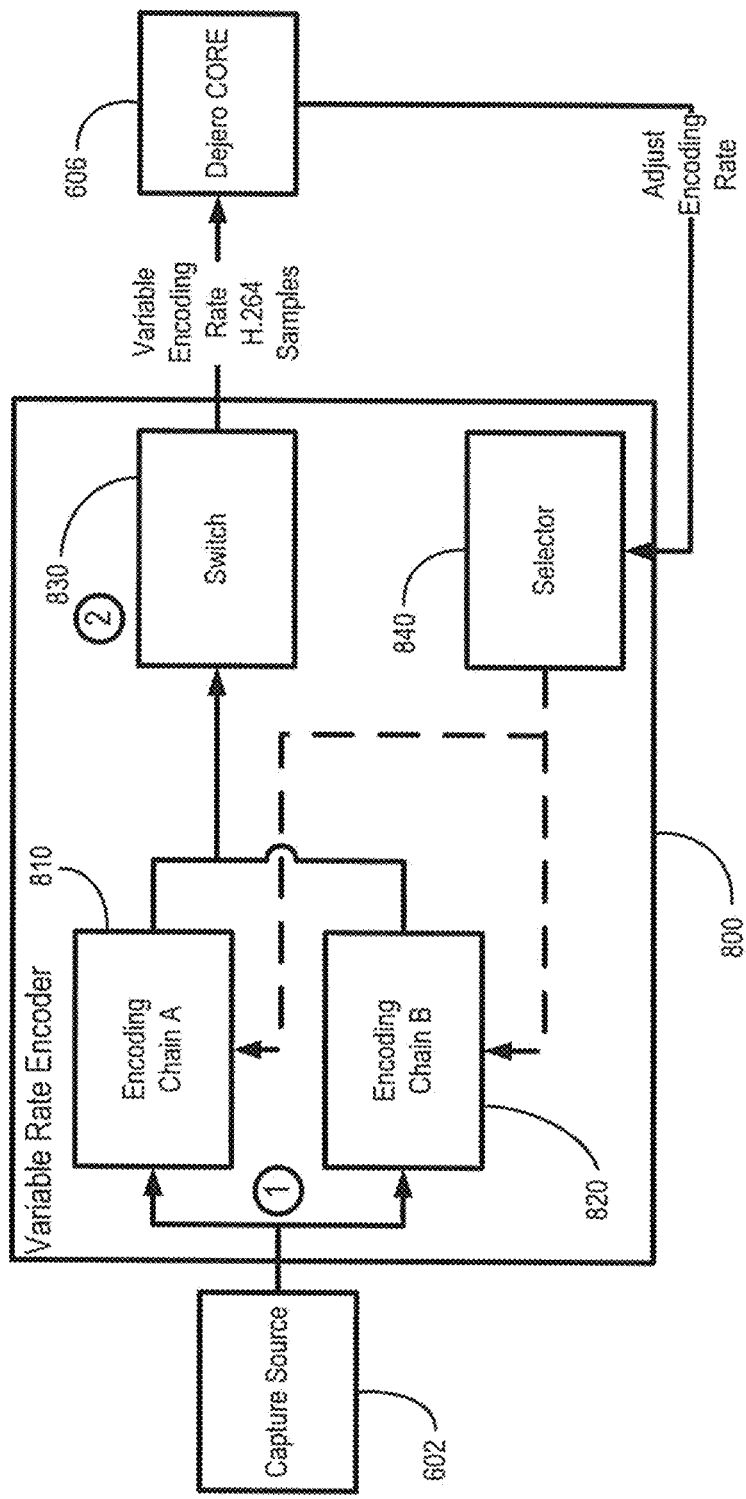
FIG. 8 is a block diagram of another detailed view of another variable rate encoder showing dual encoding chains in accordance with an embodiment.

To enable a variable encoding rate, the inventors have introduced a second encoding chain in a further modified variable rate encoder 800, as illustrated in FIG. 8.

As shown in FIG. 8, variable rate encoder 800 includes dual encoding chains, including a first encoding chain 810, and a second encoding chain 820. In accordance with an embodiment, encoder 800 initiates encoder chin 810 and begins recording a scene using a hardware encoder. Systems recording raw audio/video data and using software to encode the stream instead of a hardware encoder incurs higher costs in terms of CPU and power requirements.

At the desired fragmentation rate, a parser/reader (similar to the parser/reader 708 if FIG. 7) in the first encoding chain 810 takes video frames from the most recent recorded fragment and places them in buffer for transfer to the core system module 6-6. Each sample may be time-stamped with its recording time. In another embodiment, raw writes to disk may be intercepted, or video may be delivered from the encoder one frame at a time, all in software/memory.

In an embodiment, a switch block 830 is adapted to retrieve the frames from the first encoder 810 and pass them to the transmission module 606. When the module 800 detects a change in the availability of wireless bandwidth, a selector block 840 is notified. The selector block 840 starts a second encoding chain, namely encoding chain 820, and initializes it with a requested bit rate. The time stamp of the first sample passed to both the first encoding chain 810 and the second encoding chain 820 (as shown at 1) is recorded. This first sample is the transition sample.

Figure 9:
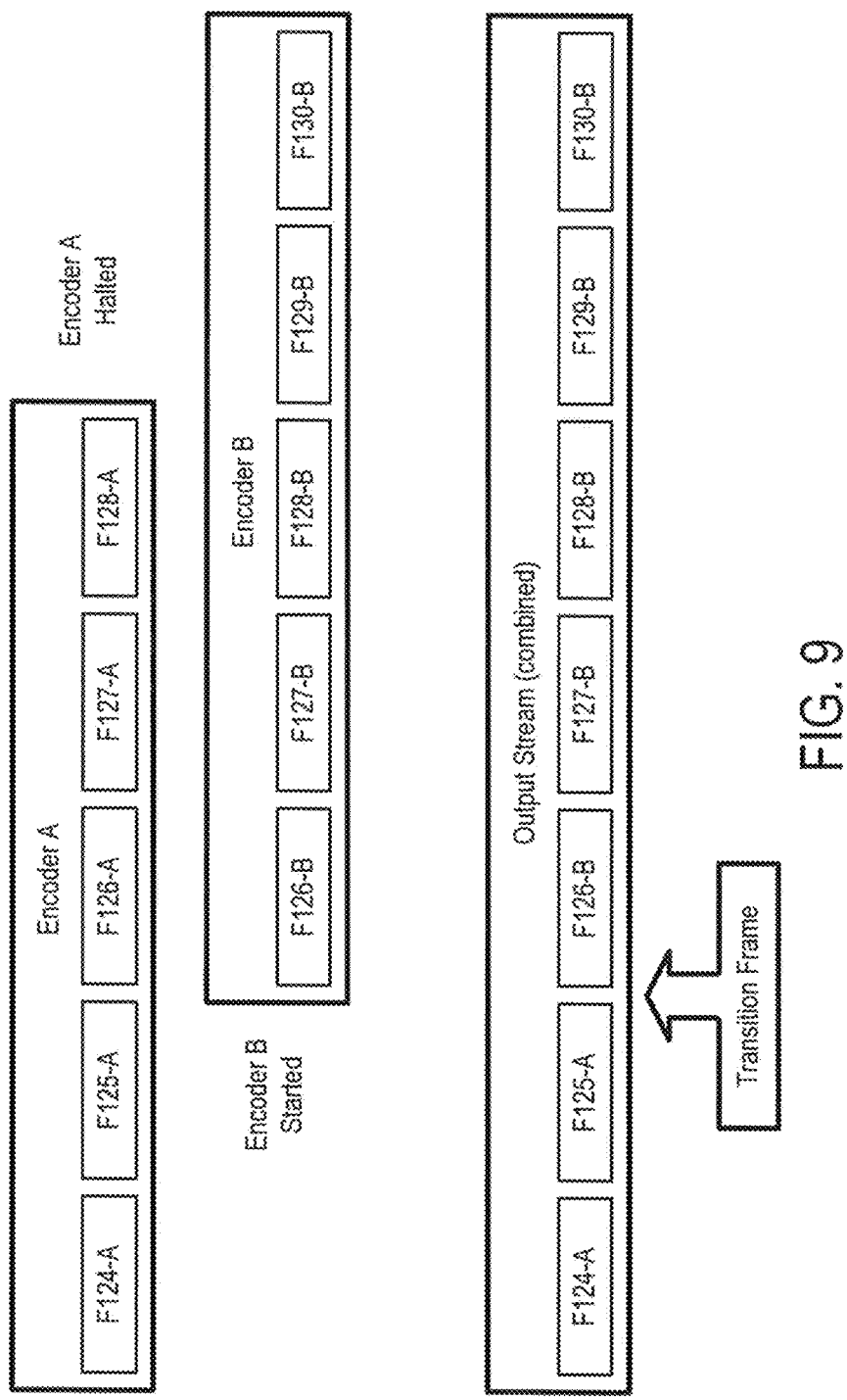
FIG. 9 is a schematic diagram of a transition sample which is the first frame that appears in the encoded stream that is encoded in both dual encoder chains.

Once the second encoding chain 820 is initiated and operating, switch block 830 requests samples from both encoding chains 810 and 820. As long as the time stamp of the current encoded sample (as shown at 2) is prior to the time-stamp of the transition sample (recorded at 1). As shown in FIG. 9, the transition sample is the first frame that appears in the encoded stream that is encoded in both encoders.

Switch 830 continues to deliver frames from the first encoding chain 810 to the transmission module 606. Once the time-stamps are equal to or later than the time-stamp of the transition sample, switch 830 starts delivering frames from the second encoding chain 820. This dual encoding chain configuration allows a seamless transition between recorders in both encoding chains 810, 820 with no lost samples. In an embodiment, once the transition is completed, switch 830 shuts down the first encoding chain 810. As there is no guarantee that the encoder will be able to return to the previous rate, shutting down the first encoding chain at this point allows the switch control to prepare for the next encoding change request. When a stream is first starting, the approximate stable bandwidth for the connection is unknown. As a result, the first encoding rate that is used can be very low, and successive stair-step increases in the encoding rate can be used until failure is seen in the channel feedback. Alternatively, successive stair-step decreases can be performed until there is no longer any failure seen in the channel feedback.

In another embodiment, while the two encoders (high and low) could continue to run simultaneously, switching back and forth between the two would result in an abrupt in bit rate showing as obvious changes in the level of detail.

Use Cases

It should be understood that the present system and method has numerous applications. For example, the present system and method may be implemented in a smart phone, such as the iPhone or other devices that use a fixed hardware encoding rate, and/or that apply a recording delay, to provide improved video recording and wireless transfer.

As another illustrative application, the present system and method provides live switching between a high quality video streaming mode and a lower quality video streaming mode without stopping the video stream. For example, a device could use a lower bit rate using the lower quality video stream to record and transmit low resolution, low bandwidth, and lower quality stream to a server with one or more connected video sources (e.g. other devices), all sending streaming video (e.g. security camera, multiple news reporters, etc). A controller/operator at the server could preview the multiple video streams and, on request, switch one or more of the streams to the high quality video stream without interruption.

The technology of the present invention may enable the changing of the encoding rate, however, the disclosed technique may also be used to change dynamically other parameters such as frame rate, resolution, or aspect ratio.

Figure 10:
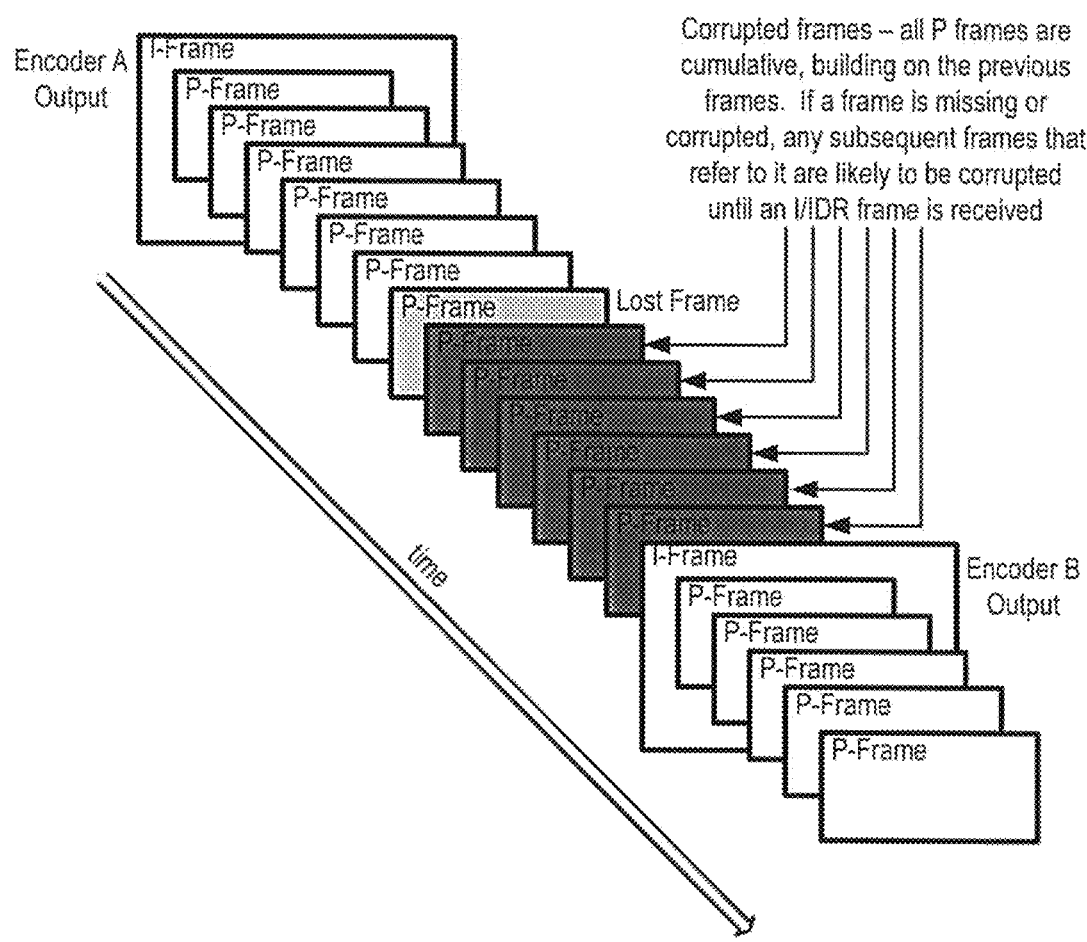
FIG. 10 is a schematic diagram illustrating when an error occurs in a video stream due to lost or corrupted data, and a string of frames may be affected until the next full frame arrives.

Another illustrative application is on demand error recovery, where video encoders use a system of whole frames followed by a number of smaller predictive frames where only a portion of the frame is encoded based on the previous frames (and in some cases forward looking as well). When an error occurs due to lost or corrupted data, the output is affected until the next full frame arrives. Since partial frames are dependent on previous frames, errors may propagate until the next full frame. This is illustrated by way of example in FIG. 10. Depending on the settings, this could be a long interval. With the present system and method of encoding multiple streams, a full frame could be forced within a short fragmentation interval (e.g. 6 samples/frames in the example above) from when an error is first detected instead of waiting for the next full frame. For example, imagine a dedicated 2 Mbps link with periodic packet loss.

The first encoder is setup at a 2 Mbps bit rate and an "infinite" (or just very large) GOP. If the receiver reports a lost frame, the second encoder is be started with the same parameters, and switched to on the transition frame. This corrects any cumulative artifacts as a result of encoding error.

In the preceding description, for purposes of explanation, numerous details are set forth in order to provide a thorough understanding of the embodiments. However, it will be apparent to one skilled in the art that these specific details may not be required in cell embodiments. In other instances, well-known electrical structures and circuits are shown in block diagram form in order not to obscure aspects of the embodiments. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable, tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

In an aspect, there is disclosed a method of transmission of data signals from a mobile device to a network comprising: encoding video data at a first encoding rate into a plurality of video frames using a first encoding module; encoding video data at a second encoding rate into a plurality of video frames using a second encoding module; detecting a change in the availability of wireless bandwidth in the network; and switching a selector to retrieve frames from either the first encoding module or the second encoding module for transmission in dependence upon the available wireless bandwidth.

In an embodiment, the method further comprises: successively increasing or decreasing, in response to a change in the available wireless bandwidth of the network, the encoding rate of whichever one of the first encoding module and the second encoding module is currently not selected; and switching the selector to retrieve frames from either the first encoding module or the second encoding module for transmission in dependence upon the available wireless bandwidth of the network.

In another embodiment, successively increasing or decreasing the encoding rate comprises applying successive stair-step increases or decreases in the encoding rate until failure is seen or no longer observed in a channel feedback from the network.

In another embodiment, the method further comprises: upon switching the selector to retrieve frames from either the first encoding module or the second encoding module for transmission in dependence upon the available wireless bandwidth, shutting down the other of the first encoding module or the second encoding module to prepare for the next encoding rate change request.

In another embodiment, the method further comprises: transmitting the frames retrieved from either the first encoding module or the second encoding module utilizing a transmission module wirelessly connected to the network.

In another embodiment, the method further comprises: detecting the change in the availability of wireless bandwidth in the network via the transmission module.

In another embodiment, the first and second encoding modules comprise a dual encoding chain, and the switch continues to retrieve frames from one of the first and second encoding modules until time-stamps are equal to or later than a time-stamp for a transition sample, whereby the dual encoding chain configuration allows a seamless transition between the first and second encoding modules without dropping a frame.

In another aspect, there is disclosed a system for transmission of data signals from a mobile device to a network comprising: a first encoding module for encoding video data at a first encoding rate into a plurality of video frames; a second encoding module for encoding video data at a second encoding rate into a plurality of video frames; means for detecting a change in the availability of wireless bandwidth in the network; and means for switching a selector to retrieve frames from either the first encoding module or the second encoding module for transmission in dependence upon the available wireless bandwidth.

In an embodiment, the system further comprises means for successively increasing or decreasing the encoding rate of whichever one of the first encoding module and the second encoding module is currently not selected in response to a change in the available wireless bandwidth of the network; and means for switching the selector to retrieve frames from the either the first encoding module or the second encoding module for transmission in dependence upon the available wireless bandwidth of the network.

In another embodiment, the system further comprises means for successively increasing or decreasing the encoding rate by applying successive stair-step increases or decreases in the encoding rate until failure is seen or no longer observed in a channel feedback from the network.

In another embodiment, the system further comprises means for shutting down the first encoding module or the second encoding module to prepare for the next encoding rate change request upon switching the selector to retrieve frames from the other of the first encoding module or the second encoding module for transmission in dependence upon the available wireless bandwidth.

In another embodiment, the system further comprises a transmitter module for transmitting the frames retrieved from either the first encoding module or the second encoding module utilizing a transmission module wirelessly connected to the network.

In another embodiment, the transmission module is adapted to detect the change in the availability of wireless bandwidth in the network.

In an embodiment, the first and second encoding modules comprise a dual encoding chain, and the switch, is adapted to continue to retrieve frames from one of the first and second encoding modules until time-stamps are equal to or later than a time-stamp for a transition sample, whereby the dual encoding chain configuration is adapted to allow a seamless transition between the first and second encoding modules without dropping a frame.

In another aspect, there is provided a computer readable medium storing computer code that when executed on a mobile device adapts the device to perform a method of transmission of data signals from the mobile device to a network, the computer readable medium comprising: code for encoding video data at a first encoding rate into a plurality of video frames using a first encoding module; code for encoding video data at a second encoding rate into a plurality of video frames using a second encoding module; code for detecting a change in the availability of wireless bandwidth in the network; and code for switching a selector to retrieve frames from either the first encoding module or the second encoding module for transmission in dependence upon the available wireless bandwidth.

In an embodiment, the computer readable medium further comprises: code for successively increasing or decreasing, in response to a change in the available wireless bandwidth of the network, the encoding rate of whichever one of the first encoding module and the second encoding module, is currently not selected; and code for switching the selector to retrieve frames from the either the first encoding module or the second encoding module for transmission in dependence upon the available wireless bandwidth of the network.

In another embodiment, the computer readable medium further comprises: code for successively increasing or decreasing the encoding rate by applying successive stair-step increases or decreases in the encoding rate until failure is seen or no longer observed in a channel feedback from the network.

In another embodiment, the computer readable medium further comprises: code for shutting down the other of the first encoding module or the second encoding module to prepare for the next encoding rate change request upon switching the selector to retrieve frames from either the first encoding module or the second encoding module for transmission in dependence upon the available wireless bandwidth.

In another embodiment, the computer readable medium further comprises: code for transmitting the frames retrieved from either the first encoding module or the second encoding module utilizing a transmission module wirelessly connected to the network.

In another embodiment, the computer readable medium further comprises: code for detecting the change in the availability of wireless bandwidth in the network via the transmission module.

The above-described embodiments are intended to be examples only. The operation of the invention the invention is described referencing particular functional components or modules, however it should be understood that the practice of the invention is not limited to an implementation based on particular functional components or a particular modular structure. Functions of the operation of the invention may be implemented with modules described as being integrated with other functional components, or modules described being implemented by a greater number of modules than as illustrated. Various functions may be implemented using hardware components, software components and/or middleware components as may be suitable in a given implementation based on performance and cost constraints. Also, various components as described above can be implemented by any functional component that may incorporate management or control functions.

Thus, alterations, modifications and variations can be effected to the particular embodiments by those of skill in the art without departing from the scope of this disclosure, which is defined solely by the claims appended hereto.

What is claimed is:

1. A method of transmission of data signals from a mobile device to a network comprising:
   encoding video data at a first encoding rate into a plurality of video frames using a first encoder;
   concurrently with the encoding using the first encoder, encoding the video data at a second encoding rate into a plurality of video frames using a second encoder;
   retrieving frames encoded by the first encoder;
   delivering the retrieved frames encoded by the first encoder for transmission over a network interface;
   detecting an availability of wireless bandwidth in the network;
   switching to retrieve frames encoded by the second encoder in response to the availability of wireless bandwidth in the network; and
   delivering the retrieved frames encoded by the second encoder over the same network interface.

2. The method of claim 1, further comprising:
   alternating, at successively increasing or decreasing encoding rates in a stair-step manner until a failure is detected in a channel feedback from the network, between retrieving of frames encoded by the first encoder and retrieving frames encoded by the second encoder wherein the alternating includes:
   upon switching to retrieve frames encoded by the second encoder:
     detecting for the failure in the channel feedback from the network, wherein when no failure is detected:
       shutting down the encoding by the first encoder;
       re-initiating encoding of the video data by the first encoder, at an increased or decreased encoding rate compared to the current encoding rate of the second encoder, into a plurality of video frames; and
       switching to retrieve frames encoded by the first encoder.

3. The method of claim 1, further comprising transmitting the delivered frames encoded by either the first encoder or the second encoder utilizing a transmitter wirelessly connected to the network.

4. The method of claim 1, wherein the availability of wireless bandwidth in the network is detected via a transmitter.

5. The method of claim 1, wherein the switching to retrieve frames encoded by the second encoder comprises:
   applying timestamps to the video data, whereby the timestamps are applied to the plurality of video frames encoded by the first encoder and to the plurality of video frames encoded by the second encoder;
   retrieving frames encoded by the first and second encoders;
   comparing the timestamps of the frames retrieved from the first encoder and the timestamps of the frames retrieved from the second encoder to establish a transition frame;
   delivering the frames retrieved from the first encoder until the transition frame is reached; and
   delivering the frames retrieved from the second encoder starting at the transition frame, such that there is a seamless transition between the delivery of the frames encoded by the first encoder and the delivery of the frames encoded by the second encoder without dropping a frame.

6. A system for transmission of data signals from a mobile device to a network comprising:

a first encoder for encoding video data at a first encoding rate into a plurality of video frames;
a second encoder for encoding, concurrently with the first encoder, the video data at a second encoding rate into a plurality of video frames;
a controller configured to:
retrieve frames encoded by the first encoder;
deliver the retrieved frames encoded by the first encoder for transmission over a network interface;
detect an availability of wireless bandwidth in the network;
switch a selector to retrieve frames encoded by the second encoder in response to the availability of wireless bandwidth in the network; and
deliver the retrieved frames encoded by the second encoder for transmission over the same network interface.

7. The system of claim 6, wherein the first encoder and the second encoder are configured encoding at a plurality of encoding rates; and
the controller is configured to:
detect for a failure in a channel feedback from the network;
alternate the selector to retrieve frames, at successively increasing or decreasing encoding rates in a stair-step manner until the failure is detected, between the frames encoded by the first encoder and the frames encoded by the second encoder for transmission in response to the availability of wireless bandwidth in the network, wherein the alternating comprises:
upon switching the selector to retrieve frames encoded by the second encoder and when no failure is detected:
shutting down the encoding by the first encoder;
re-initiating encoding of the video data by the first encoder, at an increased or decreased encoding rate compared to the current encoding rate of the second encoder, into a plurality of video frames; and
switching the selector to retrieve frames encoded by the first encoder.

8. The system of claim 6, further comprising a transmitter for transmitting the frames encoded by either the first encoder or the second encoder, the transmitter wirelessly connected to the network.

9. The system of claim 8, wherein the transmitter is adapted to detect the availability of wireless bandwidth in the network.

10. The system of claim 6, wherein the controller is configured to:
apply timestamps to the video data, whereby the timestamps are applied to the plurality of video frames encoded by the first encoder and to the plurality of video frames encoded by the second encoder; and
switch the selector to:
retrieve frames encoded by
the first and second encoders;
compare the timestamps of the retrieved frames encoded by the first encoder and the retrieved frames encoded by the second encoder to establish a transition frame;
deliver the frames retrieved from the first encoder until the transition frame is reached; and
deliver the frames retrieved from the second encoder starting at the transition frame, such that there a seamless transition between is a seamless transition between the delivery of the frames encoded by the first encoder and the delivery of the frames encoded by the second encoder without dropping a frame.

11. A computer readable medium storing computer code that when executed on a mobile device configures the device to perform a method of transmission of data signals from the mobile device to a network, the computer readable medium comprising:
code for encoding video data at a first encoding rate into a plurality of video frames using a first encoder;
code for concurrently with the encoding using the first encoder, encoding the video data at a second encoding rate into a plurality of video frames using a second encoder;
code for retrieving frames encoded by the first encoder;
code for delivering the retrieved frames encoded by the first encoder for transmission over a network interface;
code for detecting an availability of wireless bandwidth in the network;
code for switching to retrieve frames encoder the second encoder in response to the availability of wireless bandwidth in the network; and
code for delivering the retrieved frames encoded by the second encoder over the same network interface.

12. The computer readable medium of claim 11, further comprising:
code for detecting a failure in a channel feedback from the network;
code for alternating, at successively increasing or decreasing encoding rates in a stair-step manner until the failure is detected in the channel feedback from the network, between retrieving of frames encoded by the first encoder and retrieving frames encoded by the second encoder, wherein the alternating includes:
upon switching to retrieve frames encoded by the second encoder and when no failure is detected:
shutting down the encoding by the first encoder;
re-initiating encoding of the video data by the first encoder, at an increased or decreased encoding rate compared to the current encoding rate of the second encoder, into a plurality of video frames; and
switching to retrieve frames encoded by the first encoder.

13. The computer readable medium of claim 11, further comprising code for transmitting the delivered frames encoded utilizing a transmitter wirelessly connected to the network.

14. The computer readable medium of claim 11, further comprising code for detecting the availability of wireless bandwidth in the network via a transmitter.

15. A method of transmission of data signals from a mobile device to a network comprising:
applying a first transmission session parameter value so as to define a first set of video frames using a first encoder;
applying a second transmission parameter value so as to define a concurrent second set of video frames using a second encoder;
detecting an availability of wireless bandwidth in the network; and
switching a selector to selectively retrieve frames encoded by either the first encoder or the second encoder for transmission in response to the available wireless bandwidth.

16. The method of claim 15, wherein the transmission parameter value consists of frame rate, resolution and/or aspect ratio.

17. The method of claim 2, further comprising:
upon switching to retrieve frames encoded by the first encoder:
detecting for the failure in the channel feedback from the network, wherein when no failure is detected:
shutting down the encoding by the second encoder;
re-initiating encoding of the video data by the second encoder, at an increased or decreased encoding rate compared to the current encoding rate of the first encoder, into a plurality of video frames; and
switching to retrieve frames encoded by the second encoder.

18. The method of claim 2, wherein prior to the start of encoding, an approximate stable bandwidth for the connection is unknown; and the method further comprises:
determining the approximate stable bandwidth for the connection based at least on when the failure arising from the alternation of the encoding rates in the stair-step manner is detected.

19. The system of claim 6, wherein the first encoder and the second encoder are configured encoding at a plurality of encoding rates; and
the controller is configured to:
detect for a failure in a channel feedback from the network;
alternate the selector to retrieve frames, at successively decreasing encoding rates in a stair-step manner until no failure is detected, between the frames encoded by the first encoder and the frames encoded by the second encoder for transmission in response to the availability of wireless bandwidth in the network, wherein the alternating comprises:
upon switching the selector to retrieve frames encoded by the second encoder and when the failure is detected:
shutting down the encoding by the first encoder;
re-initiating encoding of the video data by the first encoder, at a decreased encoding rate compared to the current encoding rate of the second encoder, into a plurality of video frames; and
switching the selector to retrieve frames encoded by the first encoder; and
upon switching to retrieve frames encoded by the first encoder and when the failure is detected:
shutting down the encoding by the second encoder;
re-initiating encoding of the video data by the second encoder, at a decreased encoding rate compared to the current encoding rate of the first encoder, into a plurality of video frames; and
switching to retrieve frames encoded by the second encoder.

20. The system of claim 6, wherein the first encoder and the second encoder are configured encoding at a plurality of encoding rates; and
the controller is configured to:
detect for a failure in a channel feedback from the network;
alternate the selector to retrieve frames, at successively increasing or decreasing encoding rates in a stair-step manner until the failure is detected or no failure is detected, between the frames encoded by the first encoder and the frames encoded by the second encoder for transmission in response to the availability of wireless bandwidth in the network, wherein the alternating comprises:
upon switching the selector to retrieve frames encoded by the second encoder,
when no failure is detected:
shutting down the encoding by the first encoder;
re-initiating encoding of the video data by the first encoder, at an increased encoding rate compared to the current encoding rate of the second encoder, into a plurality of video frames; and
switching the selector to retrieve frames encoded by the first encoder; and
when the failure is detected:
shutting down the encoding by the first encoder;
re-initiating encoding of the video data by the first encoder, at a decreased encoding rate compared to the current encoding rate of the second encoder, into a plurality of video frames; and
switching the selector to retrieve frames encoded by the first encoder; and
upon switching to retrieve frames encoded by the first encoder,
when no failure is detected:
shutting down the encoding by the second encoder;
re-initiating encoding of the video data by the second encoder, at an increased encoding rate compared to the current encoding rate of the first encoder, into a plurality of video frames; and
switching to retrieve frames encoded by the second encoder; and
when the failure is detected:
shutting down the encoding by the second encoder;
re-initiating encoding of the video data by the second encoder, at a decreased encoding rate compared to the current encoding rate of the first encoder, into a plurality of video frames; and
switching to retrieve frames encoded by the second encoder.

21. The computer readable medium of claim 11, further comprising:
code for detecting a failure is detected in a channel feedback from the network
code for alternating, at successively decreasing encoding rates in a stair-step manner until no failure is detected, between retrieving of frames encoded by the first encoder and retrieving frames encoded by the second encoder, wherein the alternating includes:
upon switching to retrieve frames encoded by the second encoder and when the failure is detected:
shutting down the encoding by the first encoder;
re-initiating encoding of the video data by the first encoder, at an decreased encoding rate compared to the current encoding rate of the second encoder, into a plurality of video frames; and
switching to retrieve frames encoded by the first encoder; and
upon switching to retrieve frames encoded by the first encoder and when the failure is detected:
shutting down the encoding by the second encoder;
re-initiating encoding of the video data by the second encoder, at an decreased encoding rate compared to the current encoding rate of the first encoder, into a plurality of video frames; and
switching to retrieve frames encoded by the second encoder.

22. The computer readable medium of claim 11, further comprising:
- code for detecting a failure in a channel feedback from the network; and
- code for alternating, at successively increasing or decreasing encoding rates in a stair-step manner until a failure is detected or no failure is detected in the channel feedback from the network, between retrieving of frames encoded by the first encoder and retrieving frames encoded by the second encoder, wherein the alternating includes:
- upon switching to retrieve frames encoded by the second encoder:
  - when no failure is detected:
    - shutting down the encoding by the first encoder;
    - re-initiating encoding of the video data by the first encoder, at an increased encoding rate compared to the current encoding rate of the second encoder, into a plurality of video frames; and
    - switching to retrieve frames encoded by the first encoder; and
  - when the failure is detected:
    - shutting down the encoding by the first encoder;
    - re-initiating encoding of the video data by the first encoder, at an decreased encoding rate compared to the current encoding rate of the second encoder, into a plurality of video frames; and
    - switching to retrieve frames encoded by the first encoder; and
- upon switching to retrieve frames encoded by the first encoder:
  - when no failure is detected:
    - shutting down the encoding by the second encoder;
    - re-initiating encoding of the video data by the second encoder, at an increased encoding rate compared to the current encoding rate of the first encoder, into a plurality of video frames; and
    - switching to retrieve frames encoded by the second encoder; and
  - when the failure is detected:
    - shutting down the encoding by the second encoder;
    - re-initiating encoding of the video data by the second encoder, at an decreased encoding rate compared to the current encoding rate of the first encoder, into a plurality of video frames; and
    - switching to retrieve frames encoded by the second encoder.

* * * * *